3,342,660
BONDING OF RUBBER TO METAL
Gerd Angerer and Erhard Klotzer, Hanau am Main, and Werner Kern, Mainz, Germany, assignors to Dunlop Rubber Company Limited, London, England, a British company
No Drawing. Filed Oct. 10, 1963, Ser. No. 315,385
6 Claims. (Cl. 156—330)

ABSTRACT OF THE DISCLOSURE

Rubber is bonded to a metal surface by incorporating into a vulcanizable rubber composition an amount of an epoxidized rubber polymer sufficient to provide an epoxide oxygen content of about 0.1 to 1.3% based on the total rubber polymer content of said composition, and thereafter vulcanizing said rubber composition in contact with said metal surface.

---

The present invention relates to a method of bonding a rubber to a metal surface.

For producing a bond between metal surfaces and rubber compositions numerous processes are already known, but these processes have disadvantages which have not entirely been overcome. For example it has been proposed to use heavy metal salts, such as cobalt and/or nickel salts, as bonding agents between vulcanizable rubber compositions and metal surfaces and/or to incorporate such salts into the rubber. In general, however, these methods lead to very varied values of bond strength. The uncertainties brought about by this lack of uniformity in bonding substantially prevent continuous production from being a practical proposition.

It has moreover been shown that heavy-metal-salt-containing rubber compositions give diverse bond strength values after different storage times, so that it is impossible to guarantee reproducible products and properties using such bonding agents. There is a substantial risk also that a heavy metal salt in a rubber or rubber vulcanizate will act as a so-called "rubber poison" and impair the physical properties of the rubber composition.

It has now surprisingly been found that the use of heavy metal salts is unnecessary if the rubber composition is suitably modified.

According to the present invention a method of bonding a rubber composition to a metal surface comprises vulcanizing while in contact with the metal surface a vulcanizable rubber composition containing a minor proportion of an epoxidised polymer.

Suitable epoxidised polymers in the practice of this invention are epoxidation products of natural rubber, polyisoprene and polybutadiene, as well as the copolymers of the monomers of these compounds such as butadiene-styrene, and/or mixtures thereof. Moreover epoxidation products of halogenated or sulphochlorinated polymers can be used.

The epoxidation of the polymers is carried out in a known manner. The epoxide oxygen content is preferably such that the epoxidised polymer is still soluble and can be mixed with other types of rubber. Such an epoxy rubber-containing bonding agent according to the invention, which may contain the usual reinforcing fillers and vulcanizing agents, proves to be stable and also provides bonding values to metal surfaces which are maintained after storage periods of many weeks.

Suitable rubber compositions which can be bonded to metals by the method of this invention include natural rubber compositions treated with epoxidised natural rubber or with epoxide synthetic rubbers such as epoxidised polyisoprenes, epoxidised polybutadienes and epoxidised butadiene-styrene copolymers or blends thereof. Synthetic rubber compositions such as polyisoprene compositions, polybutadiene compositions and/or butadiene-styrene copolymer compositions when treated with for example epoxidised natural rubber also give excellent bonding to metals by the method of the invention.

The process according to the present invention moreover has the advantage that a special primer on the metal is unnecessary, that is, that the treated rubbers acts as bonding agent and can be vulcanized directly to the metal. It has surprisingly been shown that the process according to the invention enables to be achieved a very useful bonding of rubber not only to brass surfaces, but also to aluminium, iron, and even to unplated steel surfaces. Undesirable oxidative decomposition of the rubber, often experienced in the presence of the heavy metal salts previously considered necessary for creating a satisfactory bond to steel, is moreover substantially avoided, and vulcanizates with very good physical properties are produced.

The process of the invention makes possible the production for example of tyres with steel cord inserts, driving belts, pressure rollers, torsion elastic springs, hoses reinforced with metal wire, and in general numerous articles or products in which a firm, and yet elastic, bond of rubber and metal is important.

The present invention is illustrated by the following examples, which give preferred methods of carrying it out, and in which the surprising technical advance is also demonstrated. All parts and percentages are by weight.

For Examples I to III a standard carbon-black-reinforced natural rubber composition was used as the basic composition for bonding to metal surfaces. To this basic composition were added increasing amounts of polymeric epoxides. Then the bond strength values of the composition both to brass-plated and to unplated steel cord were tested. Six wires at a time were incorporated and vulcanized in a normal bonding mould. The test pieces were cubic, the embedded lengths of the wire amounting to 1 cm. each. Vulcanization was carried out for 40 minutes, at 140° C. After standing for 24 hours the wires were in each case torn out of the vulcanizate with the aid of a Schopper tearing machine, and the force necessary therefor was measured.

Example I

In three rubber test samples 0, 5 and 10 weight percent of the rubber content of the basic composition were replaced by an epoxidised natural rubber having an epoxide oxygen content of 4.57 percent.

The following bond values (in kg./test piece) were obtained:

| Percent rubber replaced | Percent epoxide oxygen on total rubber | Bond strength in kg./test piece | |
|---|---|---|---|
| | | Brass plated steel cord | Unplated steel cord |
| 0 | 0 | 20.1 | 6.3 |
| 5 | 0.23 | 24.2 | 7.9 |
| 10 | 0.46 | 25.7 | 11.1 |

Example II

In this example, 0, 5 and 10 weight percent of the rubber content of the basic composition were replaced by an epoxidised butadiene-styrene rubber with 5.17 percent epoxide oxygen content.

The following bond values (in kg./test piece) were obtained:

| Percent rubber replaced | Percent epoxide oxygen on total rubber | Bond strength in kg./test piece | |
|---|---|---|---|
| | | Brass plated steel cord | Unplated steel cord |
| 0 | 0 | 20.1 | 6.3 |
| 5 | 0.26 | 22.8 | 7.1 |
| 10 | 0.52 | 23.2 | 9.2 |

*Example III*

In the basic composition 5 and 10 weight percent of the rubber content were replaced by an epoxidised cis-polybutadiene rubber with 7.3 percent epoxide oxygen content.

The following bond values (in kg./test piece) were obtained:

| Percent rubber replaced | Percent epoxide oxygen on total rubber | Bond strength in kg./test piece | |
|---|---|---|---|
| | | Brass plated steel cord | Unplated steel cord |
| 0 | 0 | 20.1 | 6.3 |
| 5 | 0.37 | 22.7 | 7.7 |
| 10 | 0.73 | 23.9 | 9.1 |

The results of Examples I, II and III indicate the considerable increase in bond strength of a natural rubber composition to metals which is obtained when there is incorporated in the composition an epoxidised natural rubber or synthetic rubber in an amount which gives to the composition an epoxide oxygen content of from 0.2 percent to 0.8 percent based on the total rubber content. Adhesion when epoxidised natural rubber is present is particularly good.

In Examples IV to VI inclusive, adhesion testing of the samples was carried out using 90° mild steel conical test pieces, ¾″ in diameter, by a method described in "Rubber Age" (NY), volume 86, page 262, (1959).

The mild steel cones were prepared for each test in Examples IV and V by means of the following procedure:

(a) Wire brushed until all rubber from the previous test was removed,
(b) Degreased in trichlorethylene for 15 minutes,
(c) Etched in concentrated hydrochloric acid for 5 minutes and then thoroughly rinsed with cold tap water,
(d) Stood for 15 minutes in an aqueous solution containing 25.9 percent by weight of disodium hydrogen orthophosphate,
(e) Rinsed for 10 minutes with cold tap water,
(f) Rinsed for 10 minutes with hot tap water (about 50°–60° C.)
(g) The fine deposit of rust which had formed was removed by lightly rubbing with fine emery cloth until a bright clean surface was obtained.

Each adhesion figure given in the examples is based upon at least four tests.

For all the examples except for a comparative test with polybutadiene in Example IV a composition having the following formulation was used:

| | |
|---|---|
| Natural rubber | 100.0 |
| Sulphur | 6.0 |
| Mercaptobenzthiazole | 0.15 |
| Mercaptobenzthiazyl disulphide | 0.15 |
| Stearic acid | 1.0 |
| Zinc oxide | 5.0 |
| Antioxidant | 1.0 |
| Easy processing channel black | 65.0 |

*Example IV*

Various proportions of the natural rubber of the above composition were replaced by an epoxidised natural rubber having an epoxide oxygen content of 3.47 percent as indicated in the table below which also gives test results using two different press cures.

| Percent rubber replaced | Percent epoxide oxygen on total rubber | Bond strength to steel test piece (kg.) | | Appearance of cone after test |
|---|---|---|---|---|
| | | Cure, 50 mins. at 153° C. | Cure, 60 mins. at 148° C. | |
| 0 | 0 | 51 | | Clean and bright. |
| 4.9 | 0.17 | | 82 | Lightly covered with rubber. |
| 7.5 | 0.26 | 144 | 145 | Heavily coated with rubber. |
| 14.2 | 0.50 | 161 | | Do. |

Using the same test method the optimum bond obtainable with a similar rubber composition containing 5 parts of cobalt naphthenate is one of about 113 kg., the cone being heavily coated with rubber after the test has taken place.

A test also made with a similar rubber composition to that given in the formulation above, except that the natural rubber was replaced by polybutadiene. When 7.5 percent of the polybutadiene of the composition was replaced by the same epoxidised natural rubber as for the other tests of Example IV (to give a 0.26 percent epoxide oxygen content based on 100 parts by weight of total rubbers) and each test sample was given a press cure of 60 minutes at 60 lb. steam pressure (153° C.), the bond strength obtained was 82 kg.

The bond strength figures obtained in Example IV indicated that by using epoxidised natural rubber having epoxide oxygen contents of 0.26 percent and 0.5 percent by weight based on 100 parts by weight of total rubber content, outstanding adhesion to clean bright steel was obtained. The adhesion obtained with a 0.5 percent epoxide oxygen content was of the order of 40 percent greater than that obtained under similar conditions when 5 percent of cobalt naphthenate was used.

When the natural rubber of the basic composition was replaced by polybutadiene and 7.5 percent of the polybutadiene replaced by epoxidised natural rubber, to give a 0.26 percent epoxide oxygen content based on the total rubber, the bond was fairly good but by no means as good as obtained with a basic natural rubber composition.

*Example V*

In this example, 12.5 percent of the natural rubber of the basic composition was replaced by an epoxidised polybutadiene in which the epoxide oxygen content was 4 percent, the percentage of epoxide oxygen on the total rubber content being therefore 0.5. Test samples were press-cured for 60 minutes at 153° C. and when tested gave a bond strength of 143 kilograms which, although not quite so good as the corresponding epoxidised natural rubber figure of 161 kilograms, indicates very satisfactory adhesion.

*Example VI*

In Example VI a much higher proportion of epoxidised polybutadiene than that of Example V was used, 25 percent of the natural rubber of the basic mixing being replaced by an epoxidised polybutadiene having an epoxide oxygen content of 5 percent. The epoxide oxygen content of the composition of this test, based on the total rubber content, was therefore 1.25 percent. For this example the steel cleaning treatment was reduced to a degreasing in trichlorethylene followed by a finishing with emery cloth. The test samples were given a press cure of 60 minutes at 153° C. and the bond strength obtained was the very high figure of 172 kilograms.

Having now described our invention, what we claim is:
1. A method of bonding a rubber composition to a metal surface which comprises vulcanizing a vulcanizable rubber composition containing a minor proportion of an epoxidised rubber polymer, said composition being in contact with said metal surface during the vulcanization, the amount of said epoxidized rubber polymer being sufficient to provide the vulcanizable rubber composition with an epoxide oxygen content of about 0.1 to 1.3% by weight based on the total rubber content of said vulcanizable rubber composition.

2. A method according to claim 1 wherein said rubber composition is a natural rubber or a polybutadiene composition.

3. A method according to claim 1 wherein said epoxidised rubber polymer is an epoxidised polybutadiene or an epoxidised butadiene-styrene rubber.

4. A method according to claim 1 wherein said metal surface is unplated mild steel or brass-plated steel.

5. A method according to claim 15 wherein the rubber of the vulcanizable rubber composition contains from 5 percent to 25 percent by weight of an epoxidised rubber polymer having a 3.4 percent to 7.3 percent epoxide oxygen content.

6. A method according to claim 1 wherein the epoxide oxygen content is from 0.25 percent to 0.5 percent by weight based on the total rubber content of said vulcanizable rubber composition.

References Cited

UNITED STATES PATENTS

| | | | |
|---|---|---|---|
| 2,575,558 | 11/1951 | Newey et al. | 156—330 |
| 2,920,990 | 1/1960 | Been et al. | 161—184 |
| 2,957,794 | 10/1960 | Shetterly et al. | 156—330 |
| 3,042,545 | 7/1962 | Kienle et al. | 117—75 |
| 3,207,718 | 9/1965 | Zimmerman et al. | 260—29.6 |

EARL M. BERGERT, *Primary Examiner.*

HAROLD ANSHER, *Examiner.*